United States Patent [19]
Ross

[11] Patent Number: 4,508,427
[45] Date of Patent: Apr. 2, 1985

[54] LIQUID CRYSTAL DISPLAY DEVICE
[75] Inventor: Peter W. Ross, Stansted, England
[73] Assignee: International Standard Electric Corporation, New York, N.Y.
[21] Appl. No.: 519,466
[22] Filed: Aug. 1, 1983
[30] Foreign Application Priority Data
Oct. 22, 1982 [GB] United Kingdom ............ 8230259
[51] Int. Cl.³ .............................................. G02F 1/13
[52] U.S. Cl. ............................. 350/335; 350/350 R; 350/346; 350/333
[58] Field of Search ............... 350/335, 346, 350 R, 350/333

[56] References Cited

U.S. PATENT DOCUMENTS

| 4,105,288 | 8/1978 | Geffcken et al. ........... 350/346 X |
| 4,195,916 | 4/1980 | Coates et al. ........... 350/350 R X |
| 4,241,339 | 12/1980 | Ushiyama ........... 350/335 X |
| 4,364,039 | 12/1982 | Penz ........... 350/335 X |
| 4,391,492 | 7/1983 | Lu et al. ........... 350/333 X |

FOREIGN PATENT DOCUMENTS

| 0022311 | 2/1981 | European Pat. Off. . |
| 1464791 | 2/1977 | United Kingdom . |
| 1470475 | 4/1977 | United Kingdom . |
| 1569516 | 6/1980 | United Kingdom . |
| 2076554 | 12/1981 | United Kingdom . |
| 2020841 | 10/1982 | United Kingdom . |

Primary Examiner—John K. Corbin
Assistant Examiner—Richard F. Gallivan
Attorney, Agent, or Firm—T. L. Peterson; J. M. May

[57] ABSTRACT

A liquid crystal display device has a tandem arrangement of two cells. The rear cell is an active silicon matrix backed dyed nematic cell with 180° twist cell affording the possibility of grey scale representations. The front cell is a dyed nematic cell oriented to act as a variable density polarizer to absorb the weakly absorbed plane of the rear cell. Control of this absorption is used to optimize the contrast perception in the rear cell under different ambient lighting conditions.

5 Claims, 2 Drawing Figures

LIQUID CRYSTAL DISPLAY DEVICE

BACKGROUND OF THE INVENTION

This invention relates to liquid crystal display devices incorporating display cells of the type with picture elements (pels) arranged in a matrix array, and in which the liquid crystal layer is sandwiched between an electroded transparent front sheet and a rear sheet formed by or carrying a semiconductive layer provided with access circuitry by which the display is addressed on a line-by-line basis via a matrix array of semiconductor gates directly or indirectly connected with an overlying matrix array of liquid crystal cell electrode pads.

For alphanumeric data displays fabricated over silicon matrices the dyed cholesteric nematic phase change effect provides good contrast for a given brightness of ambient lighting. The phase change effect exhibits a significant measure of hysteresis in the characteristic relating extinction coefficient to drive voltage, but this can be tolerated in binary level display type alphanumeric displays whose pels are either 'fully on' or 'totally off'. Clearly the hysteresis presents problems in the display of data involving multilevel grey scale representation.

A solution to this problem is to use a dyed nematic mixture with a limited amount of chiral content providing between 90° and 360° twist of the director through the thickness of the liquid crystal layer. This does not provide as much extinction as the dyed phase change mode, but has the advantage that the hysteresis is substantially eliminated.

Calculations using CIE lightness scales and some subjective experimentation indicate that some improvement in subjective perception of contrast with only slight loss in brightness can be achieved by partial additional absorption of the weakly absorbed plane of polarisation of light. Detailed studies (e.g. Judd & Sysecki: Colour in Business, Science and Industry pp 264–271, 2nd Edition, 1963, published by John Wiley & Sons Inc.) indicate that the perception of grey levels is very dependent upon the brightness of the background to the display and upon the state of adaptation of the eye. Hence it would be useful to be able to control the extinction of the pels in part in accordance with the information to be displayed and in part in accordance with the perceived ambient lighting conditions.

SUMMARY

According to the present invention there is provided a liquid crystal display device incorporating a tandem arrangement of two liquid crystal display cells, the rear cell of which has a layer of dyed nematic liquid crystal medium incorporating a chiral component providing between 90° and 360° twist of the director through the thickness of the layer, which layer is sandwiched between an electroded transparent front sheet and a rear sheet formed by or carrying a semiconductive layer provided with access circuitry by which the rear cell is addressed on a line-by-line basis via a matrix array of semiconductor gates directly or indirectly connected with an overlying matrix array of liquid crystal rear cell electrode pads, wherein the surfaces defining the liquid crystal layer are such as to promote parallel homogeneous molecular alignment at the major surfaces of layer with a relative orientation matching the twist, and wherein the front cell of the tandem arrangement has a layer of dyed nematic liquid crystal medium incorporating substantially no chiral component, which cell liquid crystal layer is sandwiched between a pair of electroded transparent sheets whose surfaces are such as to promote parallel homogeneous alignment at the major surfaces of the layer in a direction aligned substantially at right angles to the alignment direction promoted by the front sheet of the rear cell.

The rear cell is used to provide the matrix display while the front cell acts as a variable density polariser. The front cell is oriented with respect to the cell in such a way that it absorbs the polarisation plane weakly absorbed by the rear cell. When the front cell is driven fully on it acts as a low density neutral filter, but at successively lower drive voltages it acts increasingly as a linear polariser.

BRIEF DESCRIPTION OF THE DRAWING

There follows a description of a display device embodying the invention in a preferred form. The description refers to the accompanying drawings in which.

DETAILED DESCRIPTION OF THE PREFERRED EMBODIMENT

Figure 1:
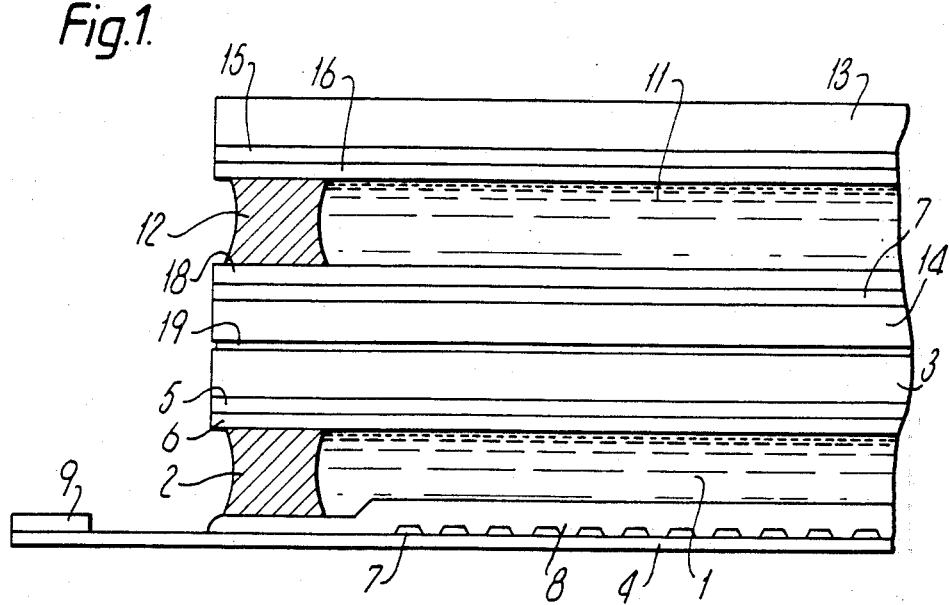
FIG. 1 depicts a schematic cross-section through the device.

The rear cell of the device is a dyed nematic on silicon cell incorporating a small amount of chiral additive providing a twist in the range 90° to 360°, and preferably of about 180°. This cell is constructed by forming an envelope for a layer 1 of liquid crystal by sealing together, with an edge seal 2, a glass sheet 3 and a single crystal wafer of silicon 4. The edge seal 2 may be a plastics seal, thereby, avoiding some of the problems associated with the use of high temperatures involved in the provision of fused glass frit edge seals. The glass sheet 3 is provided with an internal transparent electrode layer 5 which is covered with a transparent insulating layer 6 designed to prevent the passage of direct current through the cell. The silicon wafer 4 is provided with a matrix array of metal electrode pads 7 which is similarly covered with a transparent insulating layer 8. The exposed surfaces of the two insulating layers 6 and 8 are treated to promote, in the absence of any disturbing electric field, parallel homogeneous alignment of the adjacent regions of the liquid crystal layer 1. The relative orientation of the alignment direction is chosen to correspond with the amount of twist imparted by the chiral component. A preferred alignment treatment is that of rubbing applied to insulating layers 6 and 8 made of polyimide. This produces parallel homogeneous alignment with a small tilt angle, with the result that orientation of one of the layers with its alignment direction parallel with that of the other layer is distinguishable from the anti-parallel condition. Thus, in the case of a cell containing the amount of chiral additive providing the preferred 180° of twist, the rubbed polyimide layers are arranged in anti-parallel relative alignment.

The front cell of the device is also a dyed nematic cell, but incorporates no chiral additive. This cell is similar in construction to that of the rear cell and has an envelope formed by its layer 11 of liquid crystal material by sealing together, with an edge seal 12, a pair of glass sheets 13 and 14. Each of the two sheets 13, 14, is provided with an internal transparent electrode layer 15, 17, which is covered with a transparent electrically insulating layer 16, 18, and the exposed surfaces of these layers 16 and 18 are treated to promote parallel homogeneous alignment in the adjacent liquid crystal material of layer 11. A plastics edge seal is preferred and also the use of a rubbed polyimide film for molecular alignment of the liquid crystal. Since there is no twist the rubbed surfaces are in this instance assembled in antiparallel relative orientation.

The thickness of the liquid crystal layer in both cells is typically 6 microns and the cells may include intermediate spacers (not shown) within the display area constituted for instance by a distribution of short lengths of 6 micron diameter glass fibre. By way of example, the filling for the rear cell may be the anthraquinone dye marketed by BDH under the designation D96, dispersed in the nematic cyanobiphenyl eutectic mixture marketed by BDH under the designation E63, together with the requisite amount of chiral additive, constituted by the cholesteric biphenyl marketed by BDH under the designation CB15. The filling for the front cell may use the same dye dispersed in the same nematic, but in this instance with the addition of the cholesteric. In some circumstances, it may be advantageous to use a more dilute mixture than the standard one by adding extra E63. The two cells are laminated together using for instance, a layer 19 of clear epoxy resin. The relative alignment of the two cells is such that the front cell absorbs the plane of polarisation that is weakly absorbed by the rear cell, and so the alignment directions of layers 16 and 18 of the front cell are at right angles to that of layer 6 of the rear cell.

The silicon wafer of the rear cell contains circuitry for driving the pads 7, and external connection is made with this circuitry by way of a small number of pads 9.

A particular pel is driven by applying a potential to its pad 7 that is different from the potential applied to the front electrode 5. Each pad is connected to the output of a MOSFET switch formed in the wafer 4 so that, when FET is conducting, the pad can be charged up to a sufficient potential relative to that of the front electrode 5 to activate the intervening elemental volume of the liquid crystal layer to the required extent. The FET is then turned off to isolate the pad until at a later time it is refreshed or blanked. The pad is recharged with respect to the front electrode 5 after a complete cycle.

Figure 2:
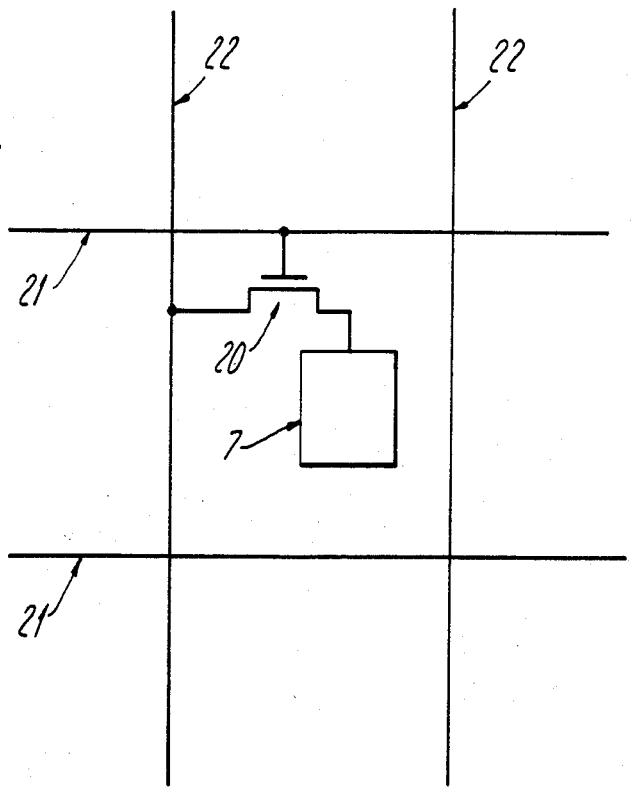
FIG. 2 depicts the basic circuit of a picture element (pel) of the rear cell of the device of FIG. 1.

The arrangement of an FET in relation to its associated pad and the row and column access lines by which it is addressed is depicted in FIG. 2. Each pel pad 7 is connected to the drain of its associated FET 20 whose gate and source are respectively connected to the associated row and column access lines 21 and 22. The display is written line-by-line, with data appropriate to each line being applied in turn to the column access lines, source lines, 22, while the row access lines, gate lines, 21 are strobed. In choosing how to make the access lines it is important to have regard to electrical risetimes, power consumption, and yield in manufacture. The source lines require particularly short risetimes and hence it is preferred to make them of metal throughout, rather than of polysilicon, and to make the gate lines of metal except at the crossovers where diffusions are used. A preferred method of driving the picture elements and circuitry for this purpose is described in corresponding application Ser. No. 481,050, filed Mar. 31, 1983, for Scanning Liquid Crystal Display Cells.

Although the foregoing specific example used a D96 and E63 filling, it should be appreciated that some improvement in performance in this application can be expected from the use of a filling having a lower birefringence host material. Also, if the device is required to have a wide service temperature range, it will be necessary to stabilize the pitch of filling for the rear cell. This may be carried out by the use of a composite chiral additive having components of opposite handedness of twist and different temperature coefficients of twisting power. These are present in inverse proportion to their coefficients to give a temperature invariant pitch. Preferably the twisting powers should be significantly different in order to avoid the need to use excessive amounts of additive. By way of example, the cholesteric CB15 can be offset with CB18 to provide a measure of temperature stabilization.

I claim:

1. A liquid crystal display device incorporating a tandem arrangement of two liquid crystal display cells the rear cell of which has a layer of dyed nematic liquid crystal medium incorporating a chiral component providing between 90° and 360° twist of the director through the thickness of the layer, which layer is sandwiched between an electroded transparent front sheet and a rear sheet formed by or carrying a semiconductive layer provided with access circuitry by which the rear cell is addressed on a line-by-line basis via a matrix array of semiconductor gates directly or indirectly connected with an overlying matrix array of liquid crystal rear cell electrode pads, wherein the surfaces defining the liquid crystal layer are such as to promote parallel homogeneous molecular alignment at the major surfaces of layer with a relative orientation matching the twist, and wherein the front cell of the tandem arrangement has a layer of dyed nematicliquid crystal medium incorporating substantially no chiral component, which front cell liquid crystal layer is sandwiched between a pair of electroded transparent sheets whose surfaces are such as to promote parallel homogeneous alignment at the major surfaces of the layer in a direction aligned substantially at right angles to the alignment direction promoted by the front sheet of the rear cell.

2. A liquid crystal display device as claimed in claim 1 wherein the chiral component provides a twist of 180°.

3. A liquid crystal display device as claimed in claim 1 wherein the chiral component has constituents of opposite handedness.

4. A liquid crystal display device as claimed in claim 2 wherein the chiral component has constituents of opposite handedness.

5. A liquid crystal display device having a tandem arrangement including a rear cell and a front cell, the rear cell being a silicon matrix backed dyed nematic cell with 180° twist cell for overriding grey scale representations, the front cell being a dyed nematic cell oriented to act as a variable density polariser for absorbing the weakly absorbed plane of the rear cell.

* * * * *